US011466903B2

(12) United States Patent
Sawa et al.

(10) Patent No.: US 11,466,903 B2
(45) Date of Patent: Oct. 11, 2022

(54) COOLING SYSTEM FOR FLUID TO BE COOLED (71) Applicant: IHI Corporation, Tokyo (JP)

(72) Inventors: Kimihiro Sawa, Tokyo (JP); Hiromichi Noma, Tokyo (JP); Taiga Yamamoto, Tokyo (JP)

(73) Assignee: IHI Corporation, Tokyo (JP)

(*) Notice: Subject to any disclaimer, the term of this patent is extended or adjusted under 35 U.S.C. 154(b) by 282 days.

(21) Appl. No.: 16/574,533

(22) Filed: Sep. 18, 2019

(65) Prior Publication Data

US 2020/0011576 A1 Jan. 9, 2020

Related U.S. Application Data (63) Continuation of application No. PCT/JP2018/035620, filed on Sep. 26, 2018.

(30) Foreign Application Priority Data

Mar. 30, 2018 (JP) .............................. JP2018-070008

(51) Int. Cl.
F25B 9/00 (2006.01)
F25B 43/00 (2006.01)
F25B 49/02 (2006.01)

(52) U.S. Cl.
CPC ............. *F25B 9/008* (2013.01); *F25B 43/00* (2013.01); *F25B 49/022* (2013.01);
(Continued)

(58) Field of Classification Search
CPC ........ F25B 9/008; F25B 43/00; F25B 49/022; F25B 2309/06; F25B 9/006; F25B 1/10; F25J 1/0055
(Continued)

(56) References Cited

U.S. PATENT DOCUMENTS 4,037,426 A * 7/1977 Rojey .................... F25J 1/0097
62/335
4,707,996 A * 11/1987 Vobach ................... F25B 25/02
62/502

(Continued)

FOREIGN PATENT DOCUMENTS

EP 1 939 548 A1 7/2008
EP 2 667 116 A1 11/2013
(Continued)

*Primary Examiner* — Steve S Tanenbaum
(74) *Attorney, Agent, or Firm* — Rothwell, Figg, Ernst & Manbeck, P.C.

(57) ABSTRACT

A cooling system includes a compressor configured to pressurize carbon dioxide to form pressurized carbon dioxide, a mixer configured to generate mixed refrigerant in which the pressurized carbon dioxide and solvent in a liquid state, a depressurization apparatus provided downstream from the mixer and configured to depressurize the mixed refrigerant, a separator configured to separate carbon dioxide in a gas state from the mixed refrigerant, a heat exchanger configured to exchange heat between the mixed refrigerant cooled through depressurization and a fluid to be cooled, and a second heat exchanger configured to cool the carbon dioxide or the mixed refrigerant using vaporized carbon dioxide or the mixed refrigerant.

1 Claim, 7 Drawing Sheets

(52) U.S. Cl.
CPC ....... *F25B 2309/06* (2013.01); *F25B 2500/04* (2013.01); *F25B 2600/21* (2013.01); *F25B 2700/21175* (2013.01)

(58) Field of Classification Search
USPC .......................................................... 62/502
See application file for complete search history.

(56) References Cited

U.S. PATENT DOCUMENTS

| | | |
|---|---|---|
| 5,715,702 A | 2/1998 | Strong et al. |
| 2002/0148246 A1 | 10/2002 | Escobar et al. |
| 2003/0167792 A1 | 9/2003 | Cho et al. |
| 2017/0313954 A1 | 11/2017 | Rebrovic |

FOREIGN PATENT DOCUMENTS

| | | | | |
|---|---|---|---|---|
| EP | 2667116 A1 | * | 11/2013 | .............. F25B 9/006 |
| EP | 2865968 A1 | | 4/2015 | |
| EP | 3 037 744 A1 | | 6/2016 | |
| EP | 3051229 A1 | | 8/2016 | |
| EP | 3239625 A1 | | 11/2017 | |
| JP | 2001-504933 A | | 4/2001 | |
| JP | 2004-170007 A | | 6/2004 | |
| JP | 2004-308972 A | | 11/2004 | |
| JP | 2007-225142 A | | 9/2007 | |
| JP | 5770157 B2 | | 8/2015 | |
| JP | 5963669 B2 | | 8/2016 | |
| KR | 10-2006-0064344 A | | 6/2006 | |
| WO | 98/59206 A1 | | 12/1998 | |
| WO | 2007/046332 A1 | | 4/2007 | |
| WO | 2015/045355 A1 | | 4/2015 | |

\* cited by examiner

COOLING SYSTEM FOR FLUID TO BE COOLED

CROSS-REFERENCE TO RELATED APPLICATIONS

This application is a Continuation Application based on International Application No. PCT/JP2018/035620, filed Sep. 26, 2018, which claims priority on Japanese Patent Application No. 2018-070008, filed Mar. 30, 2018 the contents of which are incorporated herein by reference.

TECHNICAL FIELD

This disclosure relates to a cooling system.

BACKGROUND

Conventionally, flammable fluids that are gases at normal temperatures and pressures, such as propane, have been employed as refrigerants in large-sized cooling apparatus. However, flammable fluids that are gases at normal temperatures and pressures require rigorous countermeasures against leakage or the like, and thus cannot be easily handled. For this reason, in recent times, the use of non-flammable fluids that are gases at normal temperatures and pressures as refrigerants are being considered. For example, Patent Literature 1 discloses a method using liquefied carbon dioxide as a refrigerant.

DOCUMENT OF RELATED ART

Patent Document

[Patent Document 1] Japanese Unexamined Patent Application, First Publication No. 2007-225142

SUMMARY

Technical Problem

However, some carbon dioxide becomes solid (dry ice) when the carbon dioxide is at a temperature of a triple point ($-56.6°$ C.) or less. For this reason, when the temperature of the carbon dioxide is decreased to $-56.6°$ C. or less in a cooling apparatus, the piping may be clogged due to dry ice forming inside, and feeding carbon dioxide into the cooling cycle becomes difficult. Furthermore, formation of dry ice in an apparatus caused by an operation mistake or the like may interfere with operation of the apparatus. In addition, increased energy efficiency in cooling systems using carbon dioxide is required.

In consideration of the above-mentioned problems, this disclosure aims to increase energy efficiency using carbon dioxide as a refrigerant, whilst further facilitating operation and improving reliability of apparatuses.

Solution to Problem

A cooling system of the first aspect of this disclosure includes, as a first means, a compressor configured to pressurize carbon dioxide to form pressurized carbon dioxide; a mixer configured to generate a mixed refrigerant in which the pressurized carbon dioxide and a solvent in a liquid state are mixed; a depressurization apparatus provided downstream from the mixer and configured to depressurize the mixed refrigerant; a separator configured to separate carbon dioxide in a gas state from the mixed refrigerant; a heat exchanger configured to exchange heat between the mixed refrigerant cooled through depressurization and the fluid to be cooled; and a second heat exchanger configured to cool the pressurized carbon dioxide or the mixed refrigerant using a vaporized carbon dioxide or the mixed refrigerant.

In the cooling system of the first embodiment of this disclosure, the depressurization apparatus may include a power recovery turbine, and a power recovery apparatus configured to collect kinetic energy of the mixed refrigerant from the power recovery turbine.

In the cooling system of the first embodiment of this disclosure, the second heat exchanger may be provided upstream from the depressurization apparatus and configured to cool the solvent using the vaporized carbon dioxide or the depressurized mixed refrigerant.

In the cooling system of the first embodiment of this disclosure, the second heat exchanger may be provided downstream from the depressurization apparatus and configured to cool the mixed refrigerant branched off upstream from the depressurization apparatus using the mixed refrigerant depressurized in the depressurization apparatus.

In the cooling system of the first embodiment of this disclosure, the second heat exchanger may be integrated with the heat exchanger.

In the cooling system of the first embodiment of this disclosure, the mixed refrigerant may be configured to be depressurized in a plurality of steps, and a plurality of heat exchangers and a plurality of second heat exchangers may be provided and connected to each other in series.

The cooling system of the first embodiment of this disclosure may include a compressor configured to pressurize carbon dioxide to form pressurized carbon dioxide; a mixer configured to generate a mixed refrigerant in which the pressurized carbon dioxide and a solvent in a liquid state are mixed; a depressurization apparatus provided upstream from the mixer and configured to depressurize the pressurized carbon dioxide; a separator configured to separate carbon dioxide in a gas state from the mixed refrigerant; a heat exchanger configured to exchange heat between the mixed refrigerant cooled through depressurization and a fluid to be cooled; and a second heat exchanger configured to cool the pressurized carbon dioxide or the mixed refrigerant using vaporized carbon dioxide or the mixed refrigerant.

Effects

According to this disclosure, when a second heat exchanger is provided, pressurized carbon dioxide, a mixed refrigerant or a solvent can be cooled by low temperature carbon dioxide or the mixed refrigerant vaporized through depressurization. Accordingly, energy efficiency can be improved by decreasing a temperature of the pressurized carbon dioxide and the solvent and decompressing them. Further, since the mixed refrigerant is used, the probability of piping clogging due to generation of dry ice in the pipe can be reduced, and thus the reliability of an apparatus can be improved while operation thereof is facilitated.

DESCRIPTION OF EMBODIMENTS

Hereinafter, an embodiment of a cooling system according to this disclosure will be described with reference to the accompanying drawings.

First Embodiment

Figure 1:
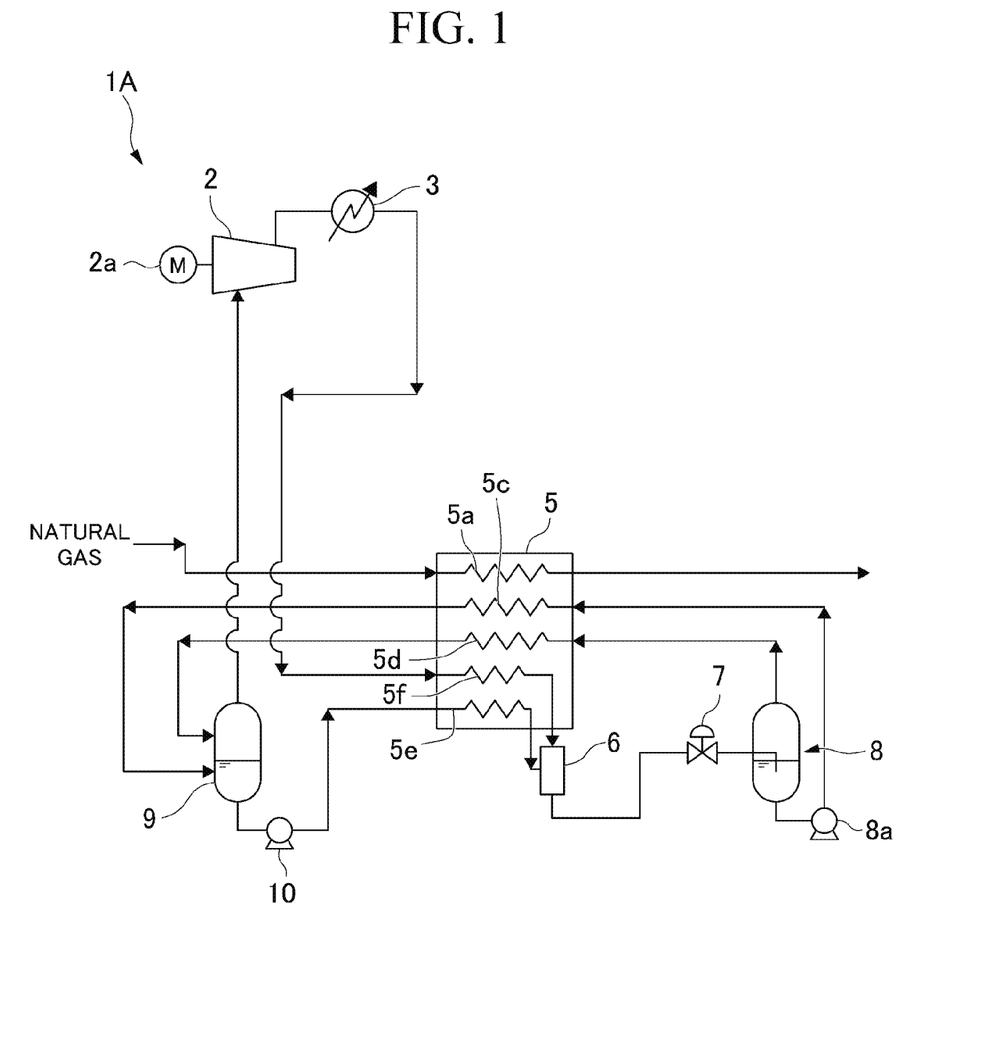
FIG. 1 is a schematic view showing a first embodiment of a cooling system according to an embodiment of this disclosure.

A cooling system 1A according to this embodiment is a system configured to pre-cool natural gas in a normal temperature state, and as shown in FIG. 1, includes a compressor 2, a cooler 3, a heat exchange apparatus 5, a mixer 6, a depressurization apparatus 7, a mixed refrigerant-carbon dioxide separator 8, a solvent-carbon dioxide separator 9 and a solvent pumping apparatus 10. In addition, a natural gas cooling system (not shown) using nitrogen as a refrigerant is provided downstream from the cooling system 1A.

The compressor 2 includes a motor 2a. The compressor 2 is an apparatus configured to pressurize carbon dioxide of about 0.5 MPaG to about 10 MPaG to form pressurized carbon dioxide.

The cooler 3 is an apparatus provided downstream from the compressor 2 and configured to cool the carbon dioxide having a high temperature by being pressurized by the compressor 2 using cooling water or the like. When the carbon dioxide passes through the cooler 3, the temperature of the carbon dioxide is about 40° C.

The heat exchange apparatus 5 is a multi-stream heat exchanger, for example, a plate fin type heat exchanger, and includes a natural gas flow path 5a, a mixed refrigerant flow path 5c, a vaporized carbon dioxide flow path 5d, a solvent flow path 5e and a pressurized carbon dioxide flow path 5f.

Natural gas in a normal temperature (about 25° C.) state is supplied to the natural gas flow path 5a. The supplied natural gas is cooled to about −50° C. when the natural gas passes through the natural gas flow path 5a.

The mixed refrigerant (about −55° C.) depressurized in the depressurization apparatus 7, cooled mainly by vaporization of the carbon dioxide, and from which carbon dioxide in a gas state is separated by the mixed refrigerant-carbon dioxide separator 8, is supplied into the mixed refrigerant flow path 5c from a direction opposite to the natural gas flow path 5a.

The carbon dioxide (about −55° C.) in a gas state separated in the mixed refrigerant-carbon dioxide separator 8 is supplied into the vaporized carbon dioxide flow path 5d in the same direction as the mixed refrigerant flow path 5c.

A solvent (a liquid such as methanol, ethanol, acetone, or the like) of about 35° C. is supplied into the solvent flow path 5e in the same direction as the natural gas. The supplied solvent passes through the solvent flow path 5e and then is cooled to about −45° C.

The pressurized carbon dioxide of about 40° C. and about 10 MPaG passing through the cooler 3 is supplied into the pressurized carbon dioxide flow path 5f in the same direction as the natural gas. The pressurized carbon dioxide passes through the pressurized carbon dioxide flow path 5f and then is cooled to about −45° C.

In the above-mentioned heat exchange apparatus 5, a configuration including the natural gas flow path 5a and the mixed refrigerant flow path 5c corresponds to a heat exchanger according to the disclosure, and a configuration including the vaporized carbon dioxide flow path 5d, the solvent flow path 5e and the pressurized carbon dioxide flow path 5f corresponds to a second heat exchanger according to the disclosure. That is, in this embodiment, flow paths of the second heat exchanger constitute a multi-stream heat exchange apparatus integrated with the heat exchanger.

The mixer 6 is connected to the solvent flow path 5e and the pressurized carbon dioxide flow path 5f and has a stirring bar or the like (not shown). The mixer 6 is an apparatus configured to mix the solvent and the pressurized carbon dioxide and generate the mixed refrigerant.

The depressurization apparatus 7 is an apparatus including a valve provided on a flow path of a mixed refrigerant flowing from the mixer 6 to the mixed refrigerant-carbon dioxide separator and configured to depressurize the mixed refrigerant from about 10 MPaG to about 0.5 MPaG to obtain a low temperature.

The mixed refrigerant-carbon dioxide separator 8 is an apparatus provided downstream from the depressurization apparatus 7 and an apparatus configured to separate the mixed refrigerant and gaseous carbon dioxide cooled to about −55° C. A mixed refrigerant feeding apparatus 8a is provided below the mixed refrigerant-carbon dioxide separator 8, and the mixed refrigerant flows to the mixed refrigerant flow path 5c of the heat exchange apparatus 5 by the mixed refrigerant feeding apparatus 8a.

The solvent-carbon dioxide separator 9 is a tank provided downstream from the mixed refrigerant flow path 5c and the vaporized carbon dioxide flow path 5d. The solvent-carbon dioxide separator 9 separates a solvent in a liquid state and carbon dioxide in a gas state. In addition, the solvent-carbon dioxide separator 9 is connected to the compressor 2 downstream therefrom.

The solvent pumping apparatus 10 is provided on a flow path of the solvent discharged from the solvent-carbon dioxide separator 9.

An operation of the cooling system 1A according to the above-mentioned embodiment will be described.

When the compressor 2 is driven, the carbon dioxide is pressurized to about 10 MPaG to become the pressurized carbon dioxide. The pressurized carbon dioxide passes through the cooler 3 and then is cooled by the cooling water to reach about 10 MPaG and about 40° C.

Then, the cooled pressurized carbon dioxide is introduced to the pressurized carbon dioxide flow path 5f, and passes through the heat exchange apparatus 5. Accordingly, in the vicinity of the outlet of the pressurized carbon dioxide flow path 5f, the pressurized carbon dioxide reaches about 10 MPaG and about −45° C.

In addition, the solvent supplied from the solvent-carbon dioxide separator 9 is introduced to the solvent flow path 5e by the solvent pumping apparatus 10. Accordingly, in the vicinity of the outlet of solvent flow path 5e, the solvent reaches about −45° C.

The pressurized carbon dioxide and solvent passing through the heat exchange apparatus 5 are input into the mixer 6 and agitated. Accordingly, the pressurized carbon dioxide and solvent become a mixed refrigerant in a liquid state. Then, the mixed refrigerant is supplied to the depressurization apparatus 7. The mixed refrigerant is depressurized from about 10 MPaG to about 0.5 MPaG to reach about −55° C. Some of the carbon dioxide in the mixed refrigerant is changed to a gas state and separated through depressurization.

The depressurized mixed refrigerant is supplied to the mixed refrigerant flow path 5c, and exchanges heat with the natural gas in the heat exchange apparatus 5. Accordingly, the mixed refrigerant reaches about 35° C., and the carbon dioxide is vaporized. The mixed refrigerant passing through the mixed refrigerant flow path 5c is stored in the solvent-carbon dioxide separator 9 and separated into carbon dioxide in a gas state and a solvent.

In addition, the carbon dioxide gas separated in the mixed refrigerant-carbon dioxide separator 8 is supplied to the vaporized carbon dioxide flow path 5d, and exchanges heat with the solvent and the pressurized carbon dioxide in the heat exchange apparatus 5. Then, the carbon dioxide in a gas state passing through the vaporized carbon dioxide flow path 5d is stored in the solvent-carbon dioxide separator 9, and returned to the compressor 2 again together with the carbon dioxide in the mixed refrigerant separated in the solvent-carbon dioxide separator 9.

In the above-mentioned cooling system 1A, the natural gas flow path 5a passes through the natural gas flow path 5a, and then is cooled from about 25° C. to about −50° C.

According to this embodiment, in the heat exchange apparatus 5, when the second heat exchanger (the vaporized carbon dioxide flow path 5d, the solvent flow path 5e, and the pressurized carbon dioxide flow path 5f) is provided, the pressurized carbon dioxide can be cooled by the vaporized carbon dioxide through depressurization. Therefore, energy efficiency can be improved. Furthermore, when the carbon dioxide and the solvent are mixed, the problem of dry ice being formed in the apparatus due to an operation mistake or the like can be prevented. In addition, the mixed refrigerant of a lower temperature than that in the related art can be provided by mixing the carbon dioxide and the solvent and decompressing the mixed refrigerant to the pressure of a triple point or less, and cyclic cooling using the carbon dioxide in a temperature zone of a triple point is also facilitated.

In addition, according to this embodiment, it is possible to cool the solvent using the second heat exchanger. Accordingly, the solvent can be cooled to the same temperature as the carbon dioxide before mixing with the carbon dioxide, and a temperature of the mixed refrigerant can be further decreased.

In addition, according to this embodiment, in the heat exchange apparatus 5, the heat exchanger and the second heat exchanger are integrated. Accordingly, energy efficiency can be increased without complicating the apparatus configuration of the cooling system 1A.

In addition, in the cooling system 1A, a valve is used for the depressurization apparatus 7. Accordingly, a simple apparatus configuration that does not perform power recovery is realized.

Second Embodiment

Figure 2:
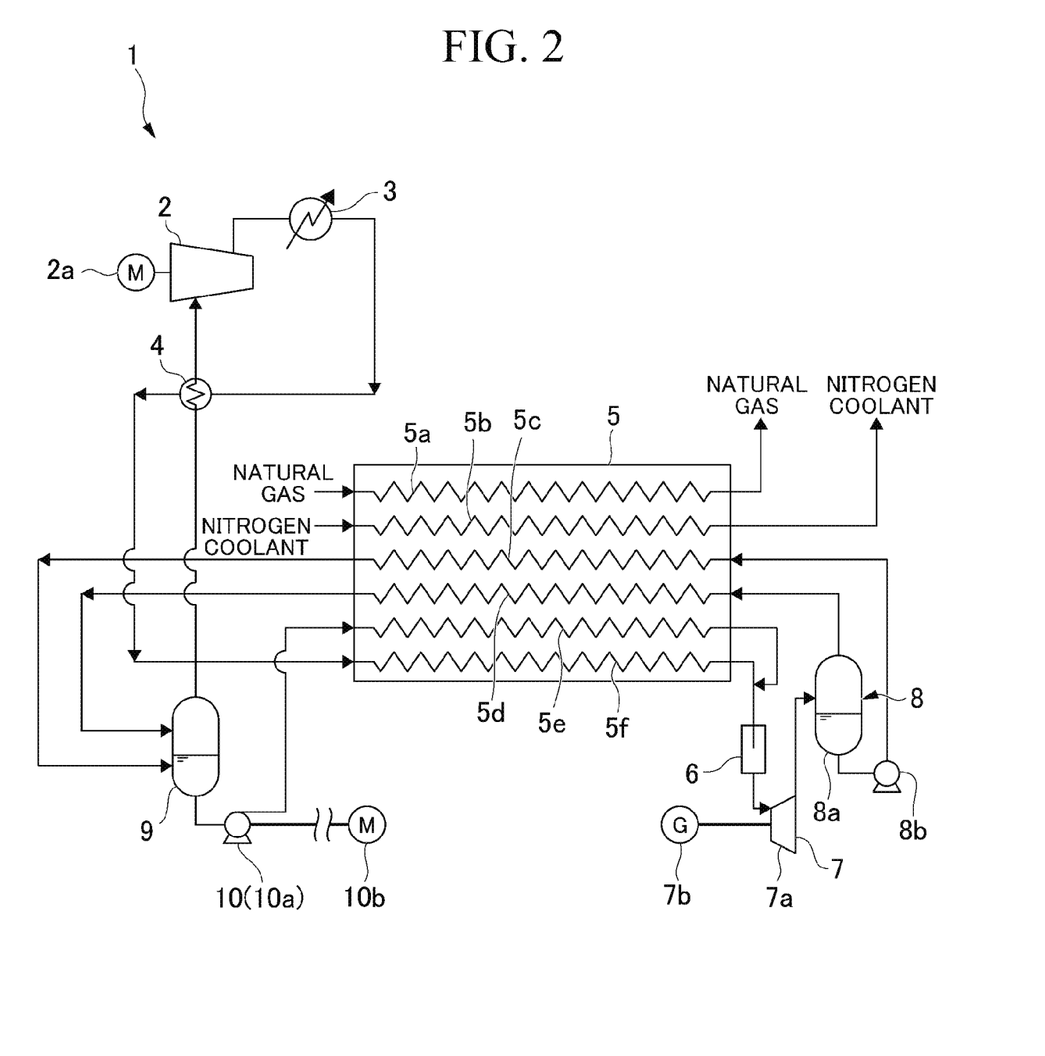
FIG. 2 is a schematic view showing a second embodiment of the cooling system according to the embodiment of this disclosure.

A variant of the first embodiment will be described as a second embodiment with reference to FIG. 2. Further, the same components as those of the first embodiment are designated by the same reference numerals, and description thereof will be omitted.

A cooling system 1 according to this embodiment newly includes a pre-cooler 4, and a power recovery turbine 7a and a generator 7b are provided in the depressurization apparatus 7. Further, the heat exchange apparatus 5 includes a nitrogen pre-cooling flow path 5b.

The pre-cooler 4 is a heat exchanger provided downstream from the cooler 3 and using carbon dioxide in a high pressure state as a primary side and using carbon dioxide returned from the solvent-carbon dioxide separator 9 as a secondary side. The pre-cooler 4 is configured to cool the carbon dioxide in a high pressure state using the carbon dioxide returned from the solvent-carbon dioxide separator 9. The carbon dioxide in a gas state passing through the vaporized carbon dioxide flow path 5d of the heat exchange apparatus 5 is stored in the solvent-carbon dioxide separator 9, supplied to a secondary side of the pre-cooler 4 together with the carbon dioxide in the mixed refrigerant separated in the solvent-carbon dioxide separator 9, and returned to the compressor 2 again. Accordingly, the pressurized carbon dioxide supplied from the compressor 2 can be cooled by the carbon dioxide on the side returning to the compressor 2.

Nitrogen in a normal temperature (about 25° C.) state used as the refrigerant in the cooling system (not shown) on the downstream side is supplied to the nitrogen pre-cooling flow path 5b in the same direction as the natural gas. The supplied nitrogen passes through the nitrogen pre-cooling flow path 5b and then is cooled to about −50° C. The nitrogen refrigerant passes through the nitrogen pre-cooling flow path 5b and then is cooled from about 35° C. to about −50° C.

The depressurization apparatus 7 is an apparatus configured to perform power generation using the generator 7b by rotating the power recovery turbine 7a using a flow of the mixed refrigerant from the mixer 6 toward the mixed refrigerant-carbon dioxide separator. That is, the depressurization apparatus 7 is an apparatus configured to collect kinetic energy of the mixed refrigerant as electrical energy.

A pump 10a is an apparatus configured to pump the solvent from the solvent-carbon dioxide separator 9 to the solvent flow path 5e. A motor 10b is connected to the pump 10a to operate the pump 10a. In addition, the motor 10b is driven by feeding power from the depressurization apparatus 7.

In addition, according to this embodiment, power of the mixed refrigerant is collected by the depressurization apparatus 7 to generate electric power. Accordingly, kinetic energy of the mixed refrigerant can be extracted, and energy efficiency can be increased.

In addition, according to this embodiment, the solvent pumping apparatus 10 receives electric power from the depressurization apparatus 7. Accordingly, the solvent pumping apparatus 10 is operated by kinetic energy of the mixed refrigerant, and energy efficiency can be further increased.

In addition, according to this embodiment, in the heat exchange apparatus 5, pre-cooling can be performed to a region of a lower temperature than that in the related art, and the nitrogen refrigerant used on a further downstream side can be cooled. Accordingly, when the cooling system 1 is used for pre-cooling, cooling efficiency of the cooling system on the downstream side can be improved, and the natural gas can be more efficiently cooled as a whole.

Third Embodiment

Figure 7:
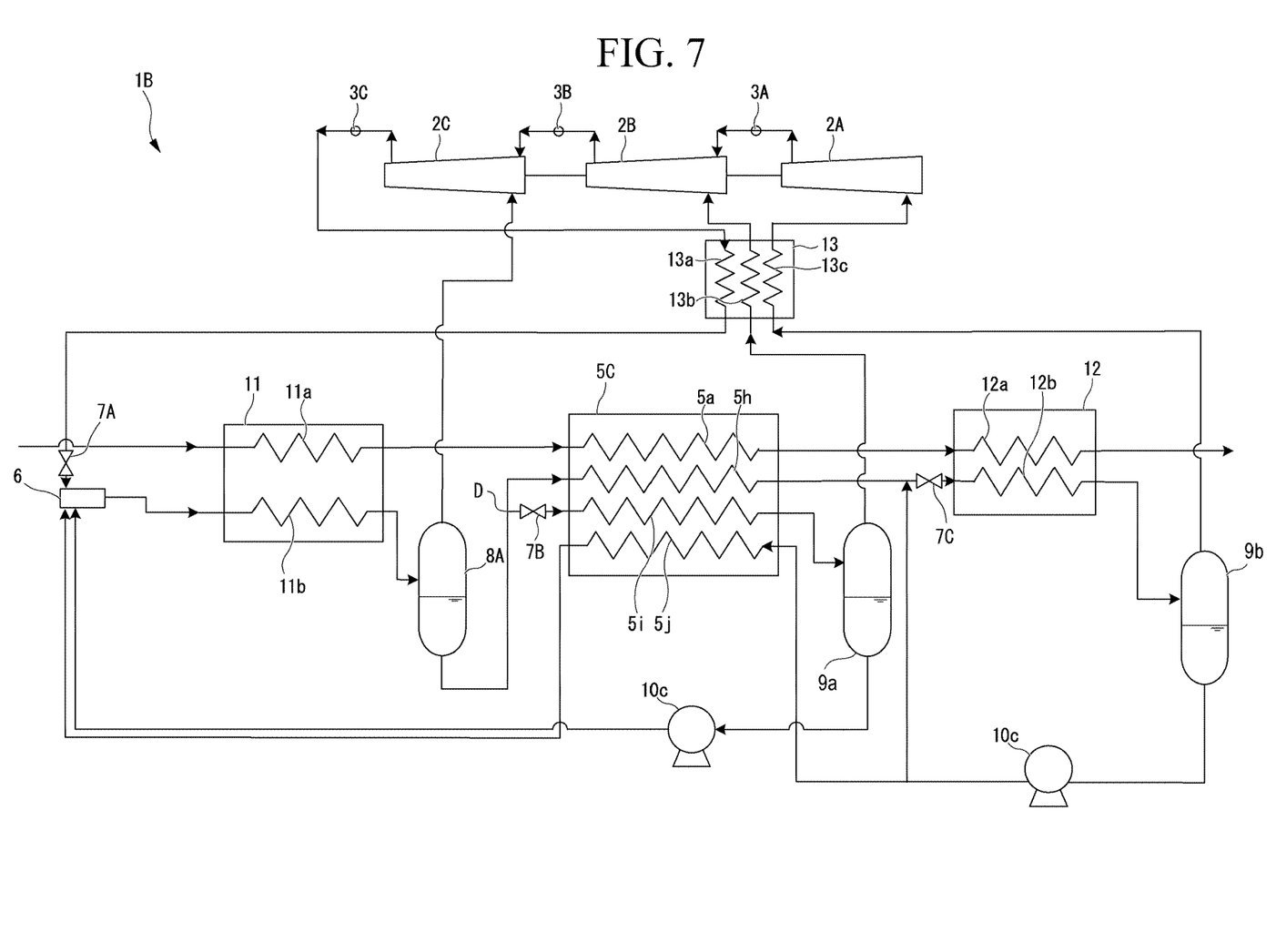
FIG. 7 is a schematic view showing a third embodiment of the cooling system according to the embodiment of this disclosure.

A variant of the first embodiment will be described as a third embodiment with reference to FIG. 7. Further, the same components as those of the first embodiment are designated by the same reference numerals, and description thereof will be omitted.

A cooling system 1B, according to this embodiment, further includes three compressors: 2A, 2B and 2C; three coolers: 3A, 3B and 3C; a front stage separator, 8A; a front stage heat exchange apparatus, 11; a rear stage heat exchange apparatus, 12; and a pre-cooling apparatus, 13. In addition, in this embodiment, instead of the heat exchange apparatus 5, the heat exchange apparatus 5C is provided.

The compressors 2A, 2B and 2C are connected to each other in series. In addition, the coolers 3A, 3B and 3C are provided on the outlet sides of the compressors 2A, 2B and 2C, respectively. Accordingly, carbon dioxide discharged from the compressors 2A, 2B and 2C is cooled by the coolers 3A, 3B and 3C.

The heat exchange apparatus 5C according to this embodiment includes a natural gas flow path 5a, a first mixed refrigerant flow path 5h, a second mixed refrigerant flow path 5i and a solvent flow path 5j. The mixed refrigerant passing through a mixed refrigerant flow path 11b (which will be described below) is supplied to the first mixed refrigerant flow path 5h. In addition, the mixed refrigerant passing through the mixed refrigerant flow path 11b (which will be described below) is supplied to the second mixed refrigerant flow path 5i in a state in which the mixed refrigerant is depressurized by the depressurization apparatus 7B (opening of a valve). That is, the mixed refrigerant flowing through the second mixed refrigerant flow path 5i has a temperature that is lower than that of the mixed refrigerant flowing through the first mixed refrigerant flow path 5h. In addition, the second mixed refrigerant flow path 5i is connected to the first solvent-carbon dioxide separator 9a on the downstream side. The solvent in a liquid state separated in the second solvent-carbon dioxide separator 9b is supplied to the solvent flow path 5j.

The front stage separator 8A is an apparatus provided between the front stage heat exchange apparatus 11 and the heat exchange apparatus 5C and configured to separate gaseous carbon dioxide from the mixed refrigerant discharged from the front stage heat exchange apparatus 11.

The front stage heat exchange apparatus 11 includes a natural gas flow path 11a and the mixed refrigerant flow path 11b. The natural gas flow path 11a is connected to an upstream side from the natural gas flow path 5a included in the heat exchange apparatus 5C. The mixed refrigerant generated in the mixer 6 is supplied to the mixed refrigerant flow path 11b. In addition, the mixed refrigerant flow path 11b is connected to the front stage separator 8A on the downstream side.

The rear stage heat exchange apparatus 12 includes a natural gas flow path 12a and a mixed refrigerant flow path 12b. The natural gas passing through the natural gas flow path 5a of the heat exchange apparatus 5C is supplied to the natural gas flow path 12a. The mixed refrigerant passing through the first mixed refrigerant flow path 5h of the heat exchange apparatus 5C is supplied to the mixed refrigerant flow path 12b after being depressurized in the depressurization apparatus 7C. The mixed refrigerant flow path 12b is connected to the second solvent-carbon dioxide separator 9b on the downstream side.

The pre-cooling apparatus 13 is an apparatus configured to previously cool the pressurized carbon dioxide discharged from the compressor 2C using the carbon dioxide that is heat-exchanged in the heat exchange apparatus 5C and the rear stage heat exchange apparatus 12. The pre-cooling apparatus 13 includes: a pressurized carbon dioxide flow path, 13a; a first carbon dioxide flow path, 13b; and a second carbon dioxide flow path, 13c. The pressurized carbon dioxide discharged from the compressor 2C is supplied to the pressurized carbon dioxide flow path 13a. The carbon dioxide passing through the second mixed refrigerant flow path 5i and separated in the first solvent-carbon dioxide separator 9a is supplied to the first carbon dioxide flow path 13b. In addition, the first carbon dioxide flow path 13b is connected to an inlet of the compressor 2B downstream therefrom. The carbon dioxide passing through the mixed refrigerant flow path 12b and separated in the second solvent-carbon dioxide separator 9b is supplied to the second carbon dioxide flow path 13c. In addition, the second carbon dioxide flow path 13c is connected to the inlet of the compressor 2A downstream therefrom.

In the cooling system 1B of this embodiment, the pressurized carbon dioxide discharged from the compressor 2C is previously cooled by the pre-cooling apparatus 13 and then depressurized when the valve of the depressurization apparatus 7A is opened, and thus, the temperature thereof is decreased. Then, the depressurized carbon dioxide is supplied to the mixer 6 together with the solvent supplied from the first and second solvent-carbon dioxide separator 9a and 9b and the mixed refrigerant supplied from the front stage separator 8A, and then mixed. The mixed refrigerant mixed in the mixer 6 is supplied to the mixed refrigerant flow path 11b of the front stage heat exchange apparatus 11 and exchanges heat with the natural gas flowing through the natural gas flow path 11a.

Then, the mixed refrigerant passing through the mixed refrigerant flow path 11b is separated into the gaseous carbon dioxide and the mixed refrigerant in the front stage separator 8A. The separated gaseous carbon dioxide is supplied to the compressor 2C. In addition, the mixed refrigerant separated in the front stage separator 8A is bifurcated at a diverging point D and supplied to the first mixed refrigerant flow path 5h and the second mixed refrigerant flow path 5i, and some of the mixed refrigerant joins the carbon dioxide and the solvent using a pump 10c as described above In addition, the mixed refrigerant supplied to the first mixed refrigerant flow path 5h is cooled through heat exchange with the depressurized mixed refrigerant flowing through the second mixed refrigerant flow path 5i.

In addition, the mixed refrigerant is depressurized by the depressurization apparatus 7B in front of the second mixed refrigerant flow path 5i, and the temperature thereof is further decreased. The mixed refrigerant flowing through the second mixed refrigerant flow path 5i exchanges heat with the mixed refrigerant flowing through the first mixed refrigerant flow path 5h, the natural gas flowing through the natural gas flow path 5a, and the solvent flowing through the solvent flow path 5j.

The mixed refrigerant passing through the first mixed refrigerant flow path 5h is supplied to the mixed refrigerant flow path 12*b* of the rear stage heat exchange apparatus 12 after the temperature thereof is decreased when depressurization is performed again in the depressurization apparatus 7C. Then, the mixed refrigerant flowing through the mixed refrigerant flow path 12*b* is supplied to the second solvent-carbon dioxide separator 9*b* after heat exchange with the natural gas flowing through the natural gas flow path 12*a*.

In addition, the mixed refrigerant passing through the second mixed refrigerant flow path 5*i* is supplied to the first solvent-carbon dioxide separator 9*a*. The mixed refrigerant in the first solvent-carbon dioxide separator 9*a* is separated into the gaseous carbon dioxide and the mixed refrigerant. The solvent separated in the first solvent-carbon dioxide separator 9*a* is delivered to the mixer 6 upstream from the front stage heat exchange apparatus 11 through the pump 10*c*. In addition, the gaseous carbon dioxide separated in the first solvent-carbon dioxide separator 9*a* is supplied to the first carbon dioxide flow path 13*b* of the pre-cooling apparatus 13.

The mixed refrigerant passing through the mixed refrigerant flow path 12*b* and supplied to the second solvent-carbon dioxide separator 9*b* is separated into the gaseous carbon dioxide and the solvent. The separated solvent passes through the solvent flow path 5*j* and is supplied to the mixed refrigerant flow path 11*b* again. In addition, some of the solvent separated in the second solvent-carbon dioxide separator 9*b* is depressurized in the depressurization apparatus 7C and then returned to the mixed refrigerant flow path 12*b*. The gaseous carbon dioxide is supplied to the second carbon dioxide flow path 13*c*.

According to the above-mentioned embodiment, the pressurized carbon dioxide is depressurized in stages and heat-exchanged at every stage. Accordingly, the solvent and the mixed refrigerant can be self-cooled while cooling the natural gas in stages, and energy efficiency can be improved.

Hereinabove, appropriate embodiments of the disclosure have been described with reference to the accompanying drawings, the disclosure is not limited to the above-mentioned embodiments. Shapes, combinations, or the like, of the components in the above-mentioned configurations are merely examples, and various modifications may be made based on design requirements or the like without departing from the spirit of the disclosure.

In the embodiment, while the cooling system 1 or 1A is a cooling apparatus configured to previously cool a natural gas, the disclosure is not limited thereto. The cooling system 1 or 1A may be used, for example, as a refrigeration system applied in the food industry. In this case, the cooling system 1 or 1A has a configuration in which a fluid to be cooled is conveyed into the heat exchange apparatus 5, without including the natural gas flow path 5*a*. In addition, the cooling system 1 or 1A of the disclosure may be a cooling system for cryogenic separation of a gas.

In addition, in the above embodiments, while the heat exchange apparatus 5 is the plate fin type heat exchanger, the disclosure is not limited thereto. For example, the heat exchange apparatus 5 may be a spiral type heat exchanger.

In addition, the solvent is not limited as long as the solvent is a material that becomes a liquid state in a temperature zone of about −70° C.

Figure 3:
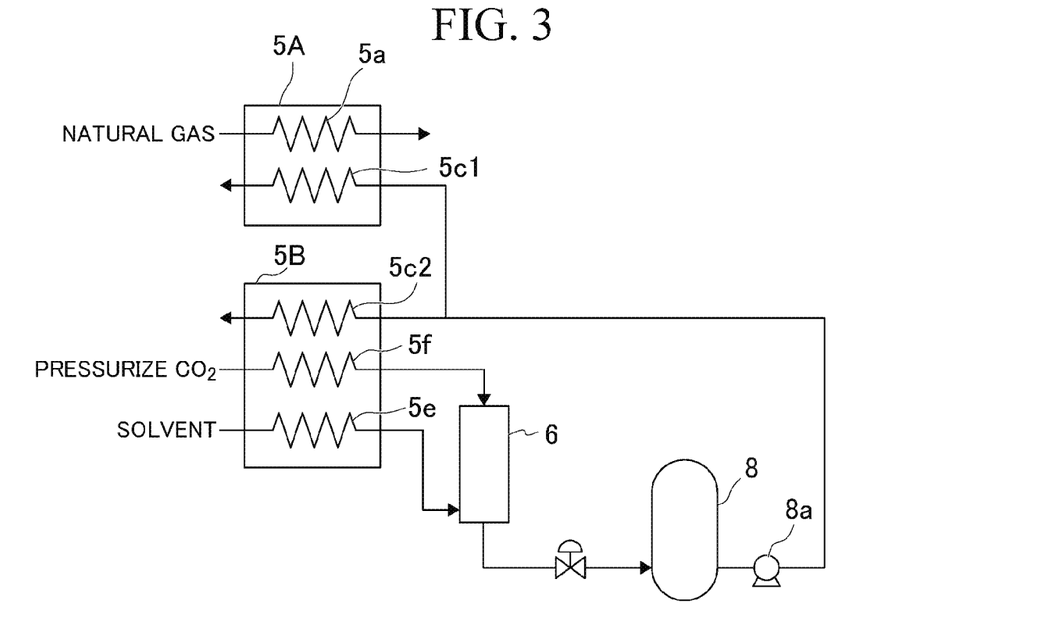
FIG. 3 is a partial schematic view showing a heat exchanger in a variant of the cooling system according to the embodiment of this disclosure.

In addition, as shown in FIG. 3, the heat exchange apparatus 5 according to the first or second embodiments can also be divided into a heat exchanger 5A and a second heat exchanger 5B (a second heat exchanger). The heat exchanger 5A includes the natural gas flow path 5*a*, and the mixed refrigerant flow path 5*c*1 in which the mixed refrigerant supplied from the mixed refrigerant-carbon dioxide separator 8 is guided. In addition, the second heat exchanger 5B includes the mixed refrigerant flow path 5*c*2 in which the mixed refrigerant supplied from the mixed refrigerant-carbon dioxide separator 8 is guided, the solvent flow path 5*e*, and the pressurized carbon dioxide flow path 5*f*.

Figure 4:
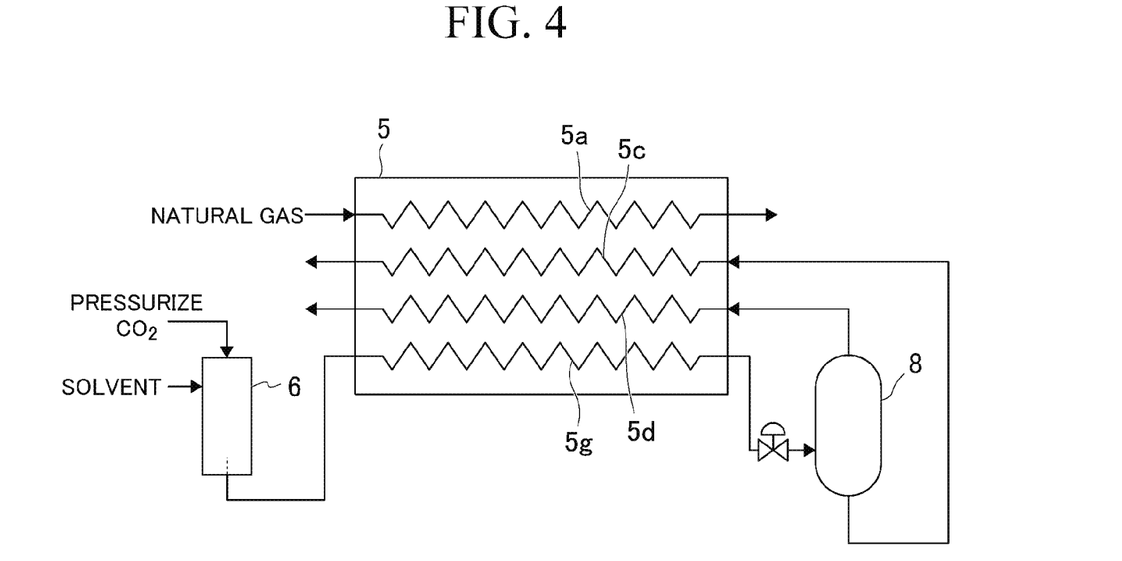
FIG. 4 is a partial schematic view showing a heat exchanger in a variant of the cooling system according to the embodiment of this disclosure.

In addition, as shown in FIG. 4, the heat exchange apparatus 5 may include a second mixed refrigerant flow path 5*g* without including the solvent flow path 5*e* and the pressurized carbon dioxide flow path 5*f*. In this case, the mixer 6 mixes the carbon dioxide and the solvent that are compressed until they become a supercritical state by the compressor 2 at an upper stage of the heat exchange apparatus 5. Accordingly, the mixed refrigerant containing the pressurized carbon dioxide is supplied to the second mixed refrigerant flow path 5*g*.

Figure 5:
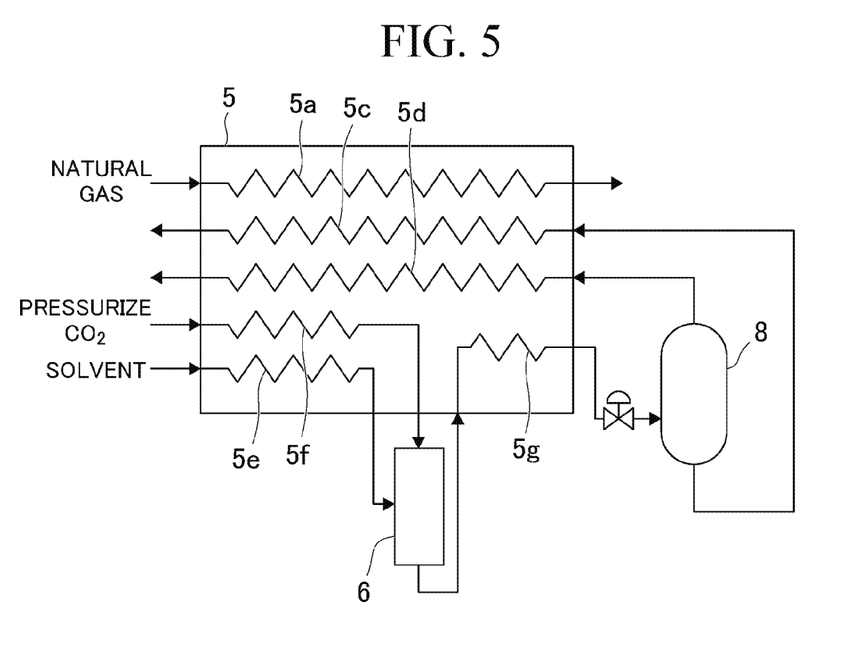
FIG. 5 is a partial schematic view showing a heat exchanger in a variant of the cooling system according to the embodiment of this disclosure.

In addition, as shown in FIG. 5, the mixed refrigerant containing the pressurized carbon dioxide can also be cooled and depressurized by mixing the pressurized carbon dioxide and the solvent cooled in the heat exchange apparatus 5 in the mixer 6 and returning the mixed refrigerant to the heat exchange apparatus 5 again. In this case, in the heat exchange apparatus 5, the mixed refrigerant can be cooled, and the mixed refrigerant can reach a lower temperature during depressurization.

Figure 6:
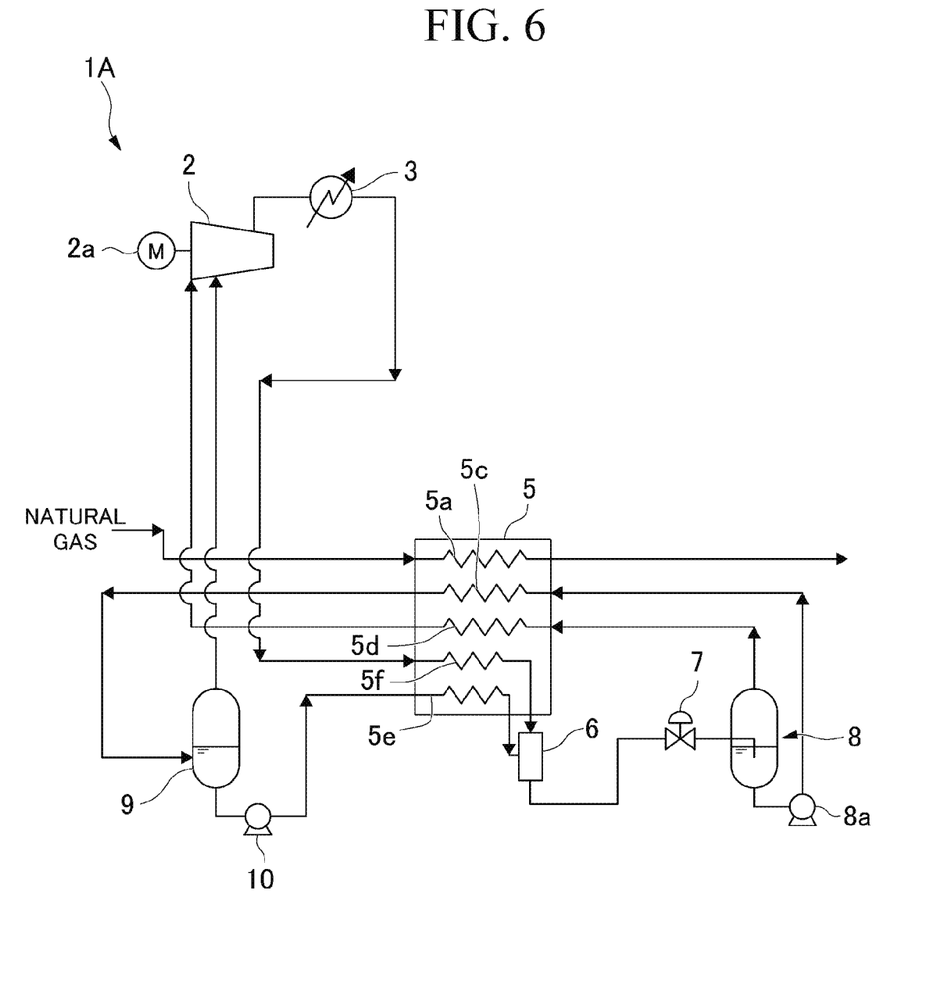
FIG. 6 is a schematic view showing a variant of the cooling system according to the embodiment of this disclosure.

In addition, as shown in FIG. 6, the cooling system 1 may increase a discharge pressure of the mixed refrigerant feeding apparatus 8*a*, may set a pressure in the solvent-carbon dioxide separator 9 to be higher than a pressure in the mixed refrigerant-carbon dioxide separator 8, and may return the carbon dioxide passing through the vaporized carbon dioxide flow path 5*d* to the compressor 2. Accordingly, the pressure in the mixed refrigerant flow path 5*c* can be increased to increase a vaporization temperature of the carbon dioxide in the flow path. Accordingly, a temperature gradient of the mixed refrigerant flow path 5*c* can be appropriately set according to a temperature gradient of the fluid to be cooled, the solvent or the pressurized carbon dioxide. In addition, when the discharge pressure of the mixed refrigerant feeding apparatus 8*a* is increased and the pressure in the solvent-carbon dioxide separator 9 is set to be higher, since the pressure of the vaporized carbon dioxide separated in the solvent-carbon dioxide separator 9 can be increased, the power consumption of compressor 2 can be reduced.

In addition, in the second embodiment, while the motor 10*b* is driven using electric power collected by the depressurization apparatus 7, the disclosure is not limited thereto. The electric power collected in the depressurization apparatus 7 may be supplied to an external apparatus.

Figure 8:
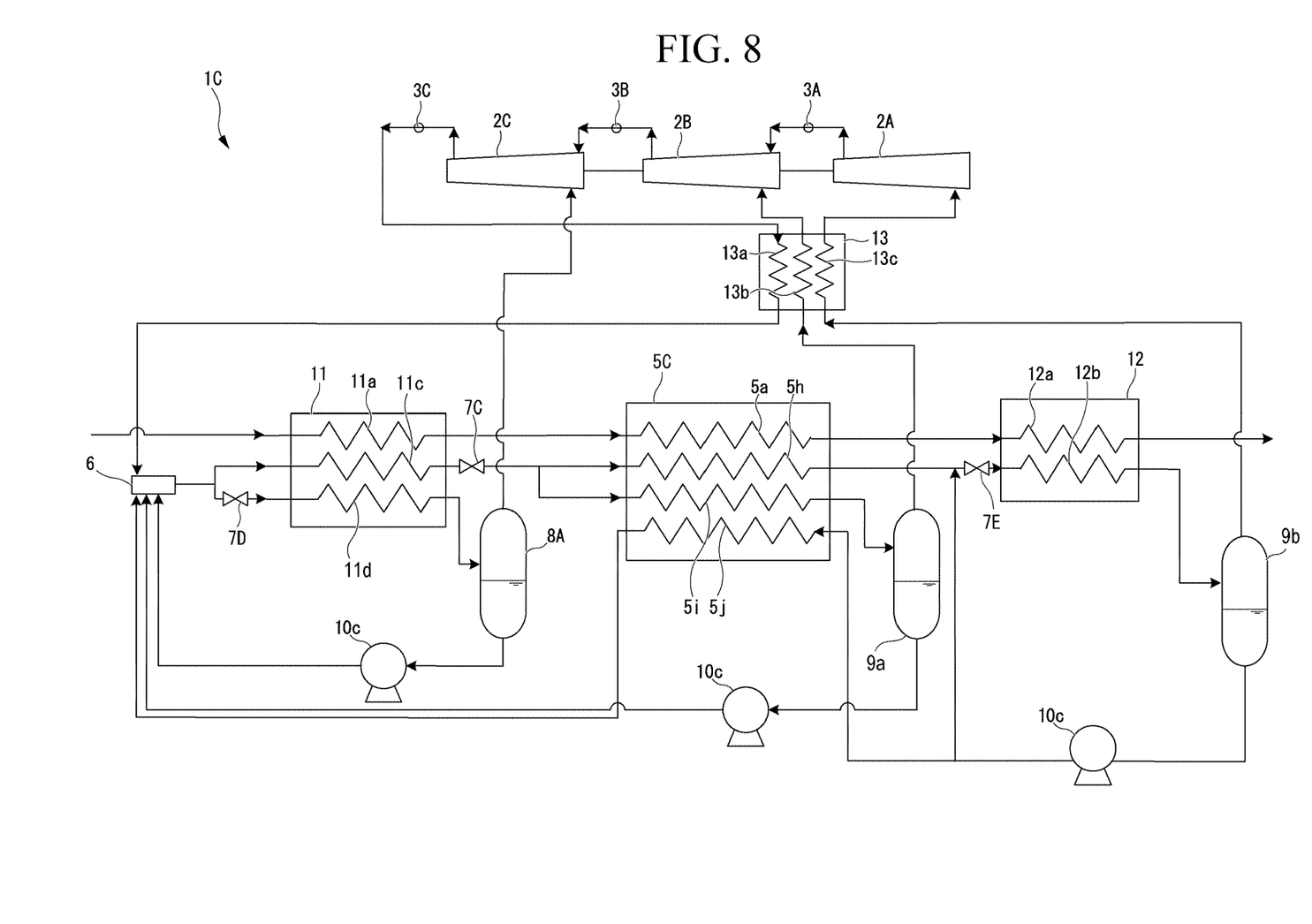
FIG. 8 is a schematic view showing a variant of the cooling system according to the embodiment of this disclosure.

In addition, a variant of the third embodiment is shown in FIG. 8. In cooling system 1C of the variant, the front stage heat exchange apparatus 11 may include a first mixed refrigerant flow path 11*c* and a second mixed refrigerant flow path 11*d*, instead of the mixed refrigerant flow path 11*b*. The solvent separated in the first solvent-carbon dioxide separator 9*a*, the solvent passing through the solvent flow path 5*j* included in the heat exchange apparatus 5C, and the carbon dioxide passing through the pre-cooling apparatus 13 are supplied to the first mixed refrigerant flow path 11*c* and the second mixed refrigerant flow path 11*d*. In addition, the mixed refrigerant supplied to the first mixed refrigerant flow path 11*c* is not depressurized and becomes a high pressure state. In addition, the mixed refrigerant supplied to the second mixed refrigerant flow path 11d is depressurized on an upstream side and becomes a state in which the temperature is lowered. The first mixed refrigerant flow path 11c is connected to the first mixed refrigerant flow path 5h and the second mixed refrigerant flow path 5i downstream therefrom. In addition, the second mixed refrigerant flow path 11d is connected to the front stage separator 8A downstream therefrom.

In addition, some of the solvent separated in the second solvent-carbon dioxide separator 9b is supplied to the mixed refrigerant flow path 12b. Further, the mixed refrigerant supplied to the mixed refrigerant flow path 12b is depressurized by the depressurization apparatus 7E.

According to the above-mentioned configuration, the cooling system 1C can cool the mixed refrigerant flowing through the first mixed refrigerant flow path 5h and in a pressurized state using the mixed refrigerant flowing through the second mixed refrigerant flow path 5i. Then, when the mixed refrigerant passing through the first mixed refrigerant flow path 5h is depressurized, the temperature of the mixed refrigerant can be decreased to a lower temperature.

In the third embodiment, while the front stage heat exchange apparatus 11 and the rear stage heat exchange apparatus 12 are provided, the present invention is not limited thereto. For example, when the heat exchange apparatus 5 of the first embodiment is changed to the heat exchange apparatus 5C, the mixed refrigerant flowing through the first mixed refrigerant flow path 5h can be cooled using the depressurized mixed refrigerant.

INDUSTRIAL APPLICABILITY

The disclosure can be used in a cooling system.
The invention claimed is:
1. A cooling system comprising:
a compressor configured to pressurize carbon dioxide to form pressurized carbon dioxide;
a depressurization apparatus configured to depressurize the pressurized carbon dioxide, the depressurization apparatus including a valve;
a mixer provided downstream from the depressurization apparatus and configured to generate a mixed refrigerant in which the pressurized carbon dioxide, which is depressurized, and a solvent in a liquid state are mixed;
a separator provided downstream from the mixer and configured to separate carbon dioxide in a gas state from the mixed refrigerant;
a second depressurization apparatus configured to depressurize the mixed refrigerant, the second depressurization apparatus including a valve and being provided downstream from the separator;
a heat exchanger configured to exchange heat between the mixed refrigerant cooled in the second depressurization apparatus through depressurization and a fluid to be cooled; and
a second heat exchanger configured to cool the mixed refrigerant in a first mixed refrigerant flow path using the mixed refrigerant cooled in the second depressurization apparatus through depressurization and in a second mixed refrigerant flow path, the second heat exchanger being integrated with the heat exchanger.

* * * * *